United States Patent [19]

Huddleston et al.

[11] Patent Number: 4,972,802
[45] Date of Patent: Nov. 27, 1990

[54] ANIMAL FEED DISPENSER SYSTEM

[75] Inventors: Terrell R. Huddleston; Allan Schmidt, both of Buhl, Id.

[73] Assignee: Clear Springs Trout Company, Buhl, Id.

[21] Appl. No.: 226,770

[22] Filed: Aug. 1, 1988

[51] Int. Cl.$^5$ .............................................. A01K 5/00
[52] U.S. Cl. ................................. 119/51.04; 119/56.2
[58] Field of Search ..................... 119/3, 52 AF, 52 B, 119/53, 56 R, 56 A, 51 R, 51.04, 56.1, 56.2

[56] References Cited

U.S. PATENT DOCUMENTS

| | | | |
|---|---|---|---|
| 2,800,256 | 7/1957 | Di Nuzzo | 119/51.04 |
| 3,029,790 | 4/1962 | London | 119/51 R |
| 3,326,187 | 6/1967 | Van Gilst et al. | 119/51 R |
| 3,502,053 | 3/1970 | Geerling | 119/51 R |
| 3,528,588 | 9/1970 | Moore | 119/51 R |
| 3,934,038 | 1/1976 | Kerr | 119/51 R |
| 4,492,182 | 1/1985 | Wensman et al. | 119/3 |

FOREIGN PATENT DOCUMENTS 733590 5/1980 U.S.S.R. ......................... 119/51.04

Primary Examiner—John Weiss
Attorney, Agent, or Firm—Schroeder, Davis & Orliss Inc.

[57] ABSTRACT

An automatic animal feed dispenser system comprising one or more batteries of hoppers for temporarily storing feed, each hopper having an outlet adjacent the base thereof through which the feed can be dispensed is provided. Each battery of hoppers is provided with a slide member having a plurality of holes therethrough, the slide member engaging the outlets of all of the hoppers in the battery. The slide member is articulated back and forth such that each of the bores through the slide member periodically receives a desired quantity of feed from a hopper and thereafter drops the feed for animal consumption. The quantity of feed received by each of the bores through slide member can be independently varied by means of inserts which are adapted to be positioned within or removed from a bore so as to decrease or increase the effective volume thereof. The slide members associated with plural batteries of hoppers can be articulated in tandem. This may be accomplished by providing a separate means for articulating each slide member, the several means for articulating the slide members being responsive to a single control mechanism.

19 Claims, 5 Drawing Sheets

ANIMAL FEED DISPENSER SYSTEM

BACKGROUND OF THE INVENTION

This invention relates to automated apparatus and methods for dispensing animal feed. More particularly, this invention relates to a novel feed dispenser system for simultaneously dispensing animal feed in measured quantities at one or more locations.

Breeding and raising various types of animals for human use or consumption is often undertaken today on a large scale, commercial basis. In such cases, it is critical to the success of the operation to ensure that the animals are efficiently fed the appropriate type of feed in the correct amounts at the proper times. Problems associated with proper feeding are perhaps nowhere more apparent than in connection with the breeding and raising of fish.

For example, when raising rainbow trout, the small, newly hatched fish are generally placed in indoor ponds under a controlled environment. For maximum success, these young fish should have the opportunity to feed continually during daylight hours or generally be fed a minimum of ten times per day. Each pond, of course, contains numerous fish, and depending on size and population, the combined fish in a single pond may consume between one ounce and one hundred pounds of fish feed per day.

When the young rainbow trout are one to three months old and two to four inches in length, they are then transferred to larger outdoor ponds. Each fish will likely remain in the outdoor ponds for an additional eight months or more until ready for market. It can thus be appreciated that the outdoor ponds of a typical fish hatchery contain a large number of fish of a variety of different sizes at any given time.

In order to ensure proper feeding, the fish in the outdoor ponds are typically graded by size such that each pond contains fish of the same general size. This also prevents larger fish from monopolizing the feed and thereby endangering the safety and development of smaller fish. Depending upon the size and number of fish in any given pond, the fish in a single pond may require anywhere between twenty and one thousand pounds of fish feed per day.

When feeding fish commercially, either in indoor or outdoor ponds, it is desirable to maintain regular, consistent feeding times. It is also preferable to feed the prescribed amount of feed in small portions, at frequent intervals, over an estimated time frame of up to 16 hours.

The practice of frequently feeding small amounts of feed over an expanded time frame has proven to be economically beneficial in several respects. It allows for the entire population of fish to receive feed during the day resulting in more uniform growth. It also allows for greater digestion time resulting in improved feed to fish weight conversion.

This practice also improves the pond environment and carrying capacity by spreading out the demand for oxygen needed to digest the feed. Conversely it spreads out the production of digestion by-products such as ammonia and carbon dioxide which are detrimental to fish.

Oxygen, ammonia, and carbon dioxide are first the limiting factors to fish growth and health. These chemical parameters become critical as water is reused throughout downstream ponds. The quality of water flowing through the pond is a key factor in determining the tonnage of fish any given pond, and thus any given hatchery facility can produce and support profitably.

With conventional application the fish are typically fed 50 to 100 pounds of feed several times a day. Feeding a large amount of feed all at once initiates frenzied swimming and feeding activities. To support these activities, the fish consume large amounts of oxygen compounding the previous considerations and bringing water oxygen levels dangerously low.

In addition to reducing the consumption of oxygen, a feed dispensing method that minimizes frenzied swimming activity allows solids to settle to the bottom within the pond where they can easily be removed, thus providing a better downstream pond environment and cleaner effluent water.

Taking all these factors into account, the advantages of feeding small amounts of feed at frequent intervals can be appreciated.

It is also highly desirable to regulate the amount of feed provided to the fish so as to coincide as closely as possible to the amount of feed actually prescribed. It is generally considered desirable that the amount of feed provided be within approximately four percent by weight of the actual amount prescribed. This maximizes the use of the feed, insures proper fish growth, ensures accurate inventory of fish and feed, and thus helps control the costs of raising the fish.

Controlling the growth rate of fish towards the desired market size and time frame is an important aspect of management strategy in the aquaculture business. Thus, a feed delivery system that delivers feed very accurately is crucial towards predicting and regulating harvest.

Conventionally, fish hatcheries have employed a staff to feed the fish by hand. This is still frequently employed when feeding small fish in inside ponds. However, the labor costs involved in feeding fish by hand may be quite high, since the fish must be fed periodically throughout an entire eight to sixteen hour day. Additionally, when feeding fish by hand, it is difficult to maintain consistent feeding times, and some variations can also be expected in the amount of feed being used. Therefore, those skilled in the art of raising fish have attempted to develop and use various types of automatic apparatus for dispensing fish feed.

The prior art apparatus for dispensing fish feed typically comprise a hopper or bin located above the fish tank for temporarily storing the fish feed. A small amount of feed from the storage bin is then automatically dispensed at periodic intervals into the fish tank.

For example, some prior art apparatus comprise a means for periodically opening one or more outlets of the feed storage bin so as to permit feed to drop from the storage bin into the fish tank. Then, after a predetermined time period, the outlets of the storage bin are closed.

Other prior art apparatus comprise a measuring cup or bucket positioned under an outlet of the feed storage bin so as to receive a measure of feed therein. At the appropriate time, after the cup or bucket has been filled, the outlet of the storage bin is closed, and the contents of the cup or bucket are dumped into the fish tank. Thereafter, the cup or bucket is repositioned under the storage bin and refilled in preparation for the next feeding time.

In still other prior art apparatus, feed is dispensed from the storage bin by means of a slide member positioned under the storage bin. The slide member has a channel therethrough. In one position, the channel through the slide member is positioned under the storage bin so as to receive a quantity of feed, the associated apparatus housing temporarily preventing the fish feed from falling out of the channel through the slide member. When the slide member is thereafter moved such that the channel through the slide member is no longer in alignment with the outlet of the storage bin, the slide serves to close the outlet of the feed storage bin. At the same time, the channel through the slide member carries a quantity of feed. Finally, the slide member is positioned such that the feed can drop out of the channel through the slide member and into the fish tank.

The prior art apparatus for dispensing fish feed are typically actuated by means of a solenoid, an electric motor with appropriate gearing, or other mechanical or electrical means. Many prior art apparatus are provided with timer devices such that feed can be dispensed at regular, fixed time intervals. Alternatively, some prior art apparatus are demand-type feeders that comprise a trip wire or like means which extends into the fish tank, and the apparatus dispenses a quantity of fish feed each time the fish hit the trip wire. It will be appreciated that the prior art apparatus for dispensing fish feed offer certain advantages over feeding fish by hand. Nevertheless, prior art fish feeding apparatus suffer from a number of significant disadvantages.

The prior art apparatus for dispensing fish feed have typically been fairly complex. Each apparatus generally has numerous mechanical parts, thus making the apparatus fairly expensive to manufacture and maintain.

Prior art fish feeding apparatus, unfortunately, often waste significant amounts of feed. This is particularly the case when using demand-type feeders. Mechanisms for demand-type feeders are difficult to keep in adjustment and require frequent attention. If a mechanism is too tight, too little feed will be dispensed and, conversely, if the mechanism is too loose, too much feed may be dispensed. This can result not only in the loss of feed and fish gain, but also in a degradation of the water quality and the fish rearing environment. Further, wasted feed may dissolve and clog the gills of fish which is detrimental to their health.

Operation of the prior art apparatus often results in shearing and/or grinding the feed pellets into small particles referred to as "fines". Particularly with larger fish, the fines are not eaten and a substantial portion of the feed is lost. If collected, the fines can be remilled into fresh pellets. But once in the water, they break down and clog the fish gills, making it difficult for the fish to draw oxygen from the water.

As mentioned above, different sizes of fish consume different amounts of fish feed in a day. Unfortunately, some prior art fish feeding apparatus do not permit adjustment of the amount of feed dispensed. Other prior art apparatus provide for some adjustment of the quantity of feed being dispensed, but such adjustment often requires the replacement and/or adjustment of internal parts which can frequently be both difficult and time consuming and which may, in some cases, require at least the partial disassembly of the apparatus. Significantly, even those prior art apparatus which do provide for some adjustment of the amount of feed dispensed cannot readily cover the broad range of feed rates which are generally thought to be most desirable in commercial fish hatcheries.

In addition to consuming different amounts of feed, different sizes of fish also require feed of somewhat different consistencies. For example, very young fish may require feed having the consistency of ground flour, while older fish may need to be provided with feed having the consistency of small pellets. Unfortunately, many prior art feeding apparatus cannot handle the entire range of consistencies of feed required, and this necessitates the use of several different types of fish feeders throughout the life of the fish.

Another significant disadvantage of prior art fish feeders is that some of the apparatus are significantly affected by moisture. Some prior art apparatus are formed of metal which can rust or corrode over time. As mentioned above, some prior art apparatus also use fairly complex electrical systems which may render them unsafe to workers who must work in the vicinity of the apparatus.

Also, many of the prior art fish feeders have clogging and bridging problems associated with various consistencies of feed and moisture. When this occurs, the feeders are not functional until the clog or bridge is removed.

OBJECT OF THE INVENTION

In view of the foregoing, it is a primary object of the present invention to provide an automatic feed dispenser system which is simple in construction and inexpensive to manufacture and maintain.

It is also an object of the present invention to provide an automatic feed dispenser system which minimizes the waste of feed.

In addition, it is an object of the present invention to provide an automatic feed dispenser system which can accurately and reliably dispense the correct amount of feed.

It is a further object of the present invention to provide an automatic feed dispenser system which permits the accurate control of feeding times and facilitates the dispensing of small amounts of feed at frequent time intervals over an extended time period.

It is a still further object of the present invention to provide an automatic feed dispenser system which permits the ready adjustment of the amount of feed being dispenses over a broad range.

Also, it is an object of the present invention to provide an automatic feed dispenser system which can easily handle feed of a variety of consistencies.

It is another object of the present invention to provide an automatic feed dispenser system which is resistant to moisture, clogging and bridging, and safe to workers.

Consistent with the foregoing objects, the present invention is directed to an automatic animal feed dispenser system. The system comprises one or more batteries of hoppers for temporarily storing feed, each hopper having an outlet adjacent the base thereof through which the feed can be dispensed. Each battery of hoppers is provided with a slide member which engages the outlets of all of the hoppers.

The slide member of each battery of hoppers has a plurality of bores therethrough. Each bore through the slide member can be positioned so as to communicate with the outlet of a hopper, thereby being filled with feed from the hopper. Means are provided for preventing the feed from falling out of the bores through the slide member when the bores are in communication with an outlet of a hopper. The feed contained within a bore through the slide member is permitted to drop from the bore only when the bore is not in communication with an outlet of a hopper. Significantly, when an outlet of a hopper is not in communication with one or more of the bores through the s.lide member, the slide member engages the outlet of the hopper so as to prevent feed from escaping therethrough.

Means are provided for articulating the slide member of each battery of hoppers. The slide member is preferably articulated back and forth at a predetermined periodic rate such that each of the bores through the slide member periodically receives a quantity of feed from a hopper and thereafter drops the feed for animal consumption. Significantly, the quantity of feed received by each of the bores through a slide member can be independently varied by means of inserts which are adapted to be positioned within a bore through the slide member so as to decrease the effective volume thereof.

When two or more batteries of hoppers are used in a single feed dispenser system, the slide members associated with the several batteries of hoppers can advantageously be articulated in tandem. This may be accomplished by providing a separate means for articulating each slide member, the several means for articulating the slide members being responsive to a single control mechanism. For example, each slide member may be articulated by a water-powered ram, the various rams being interconnected to a single control mechanism for supplying water power to the rams.

These and other objects and features of the present invention will become more fully apparent from the following description and appended claims, taken in conjunction with the accompanying drawings.

DETAILED DESCRIPTION OF THE PREFERRED EMBODIMENTS

The animal feed dispenser system of the present invention can be readily used to dispense feed to a variety of different kinds of animals. Nevertheless, for the sake of simplicity, the detailed description which follows will describe the animal feed dispenser system with reference to the feeding of fish. It is believed that the present invention is particularly well-suited to the feeding of large numbers of fish in commercial fish hatcheries.

It will be readily appreciated that the components of the present invention, as generally described and illustrated in the figures herein, could be arranged and designed in a wide variety of different configurations. Thus, the following more detailed description of the animal feed dispenser system of the present invention, as represented in FIGS. 1-6, is not intended to limit the scope of the invention, as claimed, but it is merely representative of the presently preferred embodiments of the invention. The presently preferred embodiments of the invention will be best understood by reference to the drawings, wherein like parts are designated with like numerals throughout.

Figure 1:
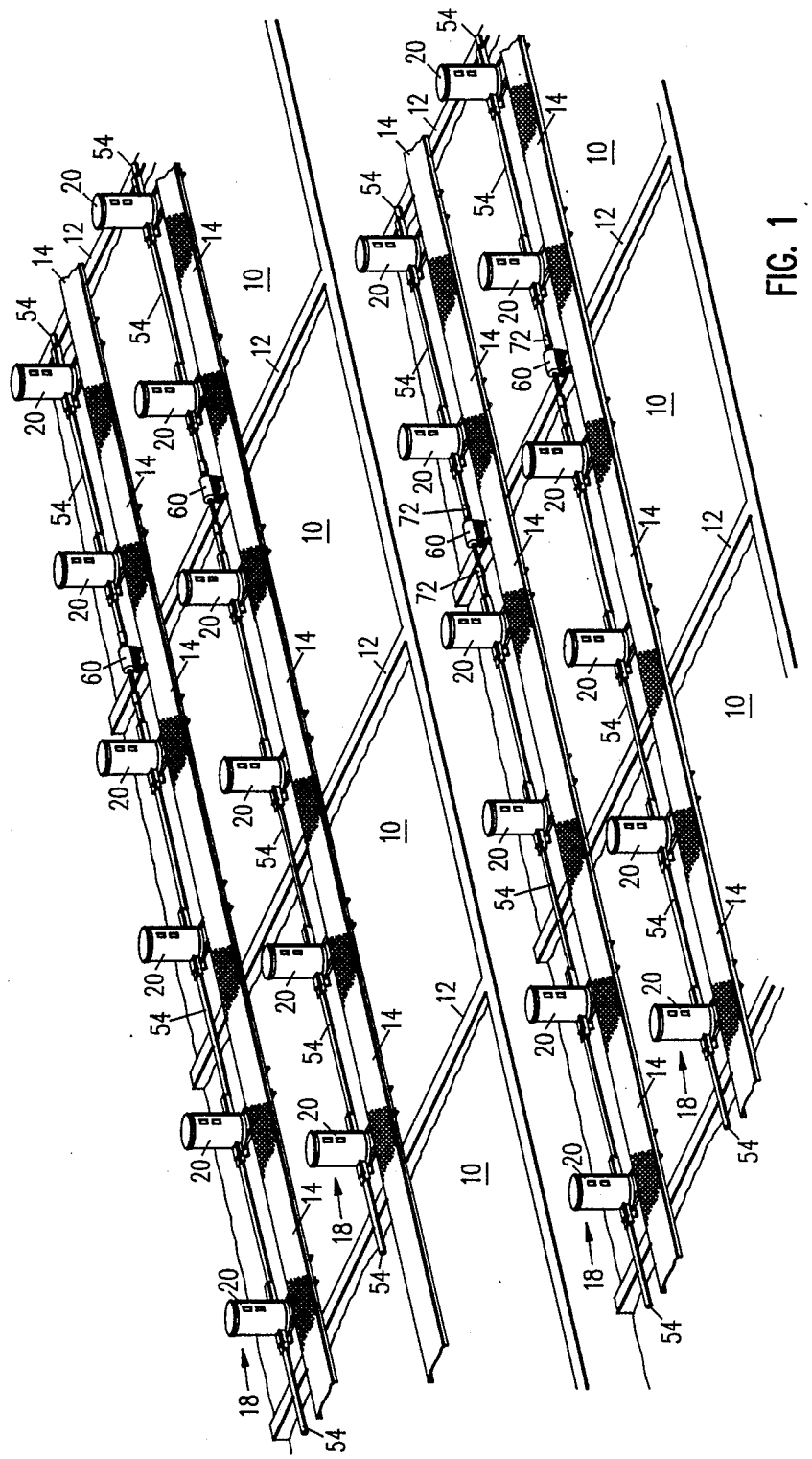
FIGS. 1 and 1A are a perspective view of one presently preferred embodiment of an animal feed dispenser system in accordance with the present invention.
Figure 1A:
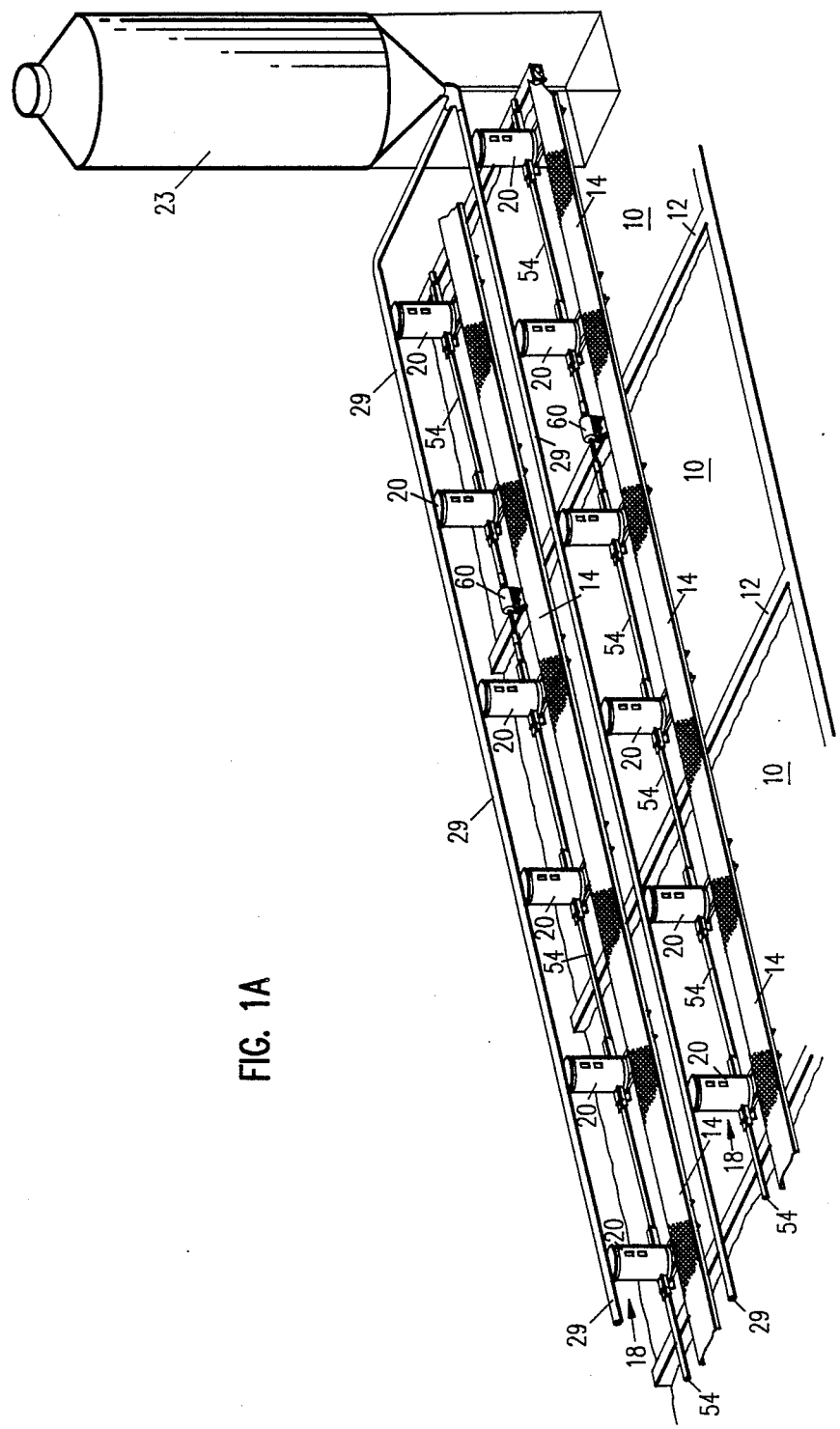

One presently preferred embodiment of the animal feed dispenser system of the present invention is illustrated in FIG. 1. As shown, the feed dispenser system comprises several batteries 18 of hoppers 20 is provided with a slide member 54 which engages all of the hoppers in a single battery 18.

An articulation means 60 is provided for articulating the slide member 54 of each battery 18 of hoppers 20. As will be more fully appreciated from the discussion which follows, the articulation of slide members 54 causes a fixed quantity of feed to be periodically extracted from each hopper 20 and dropped into the adjacent fish pond 10.

Figure 2:
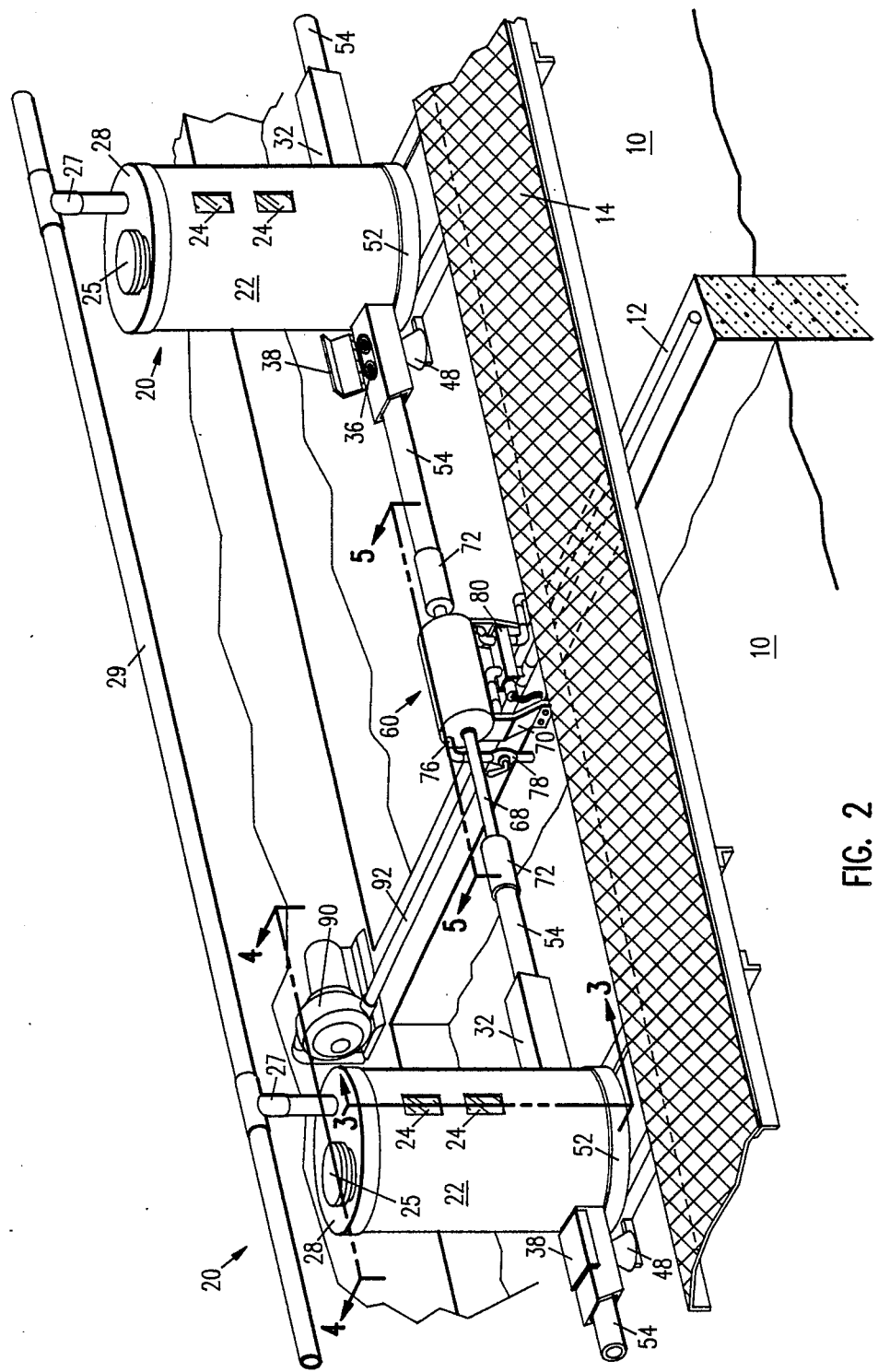
FIG. 2 is a perspective view showing two hoppers of one presently preferred embodiment of the present invention, together with the means for articulating the associated slide member.
Figure 4:
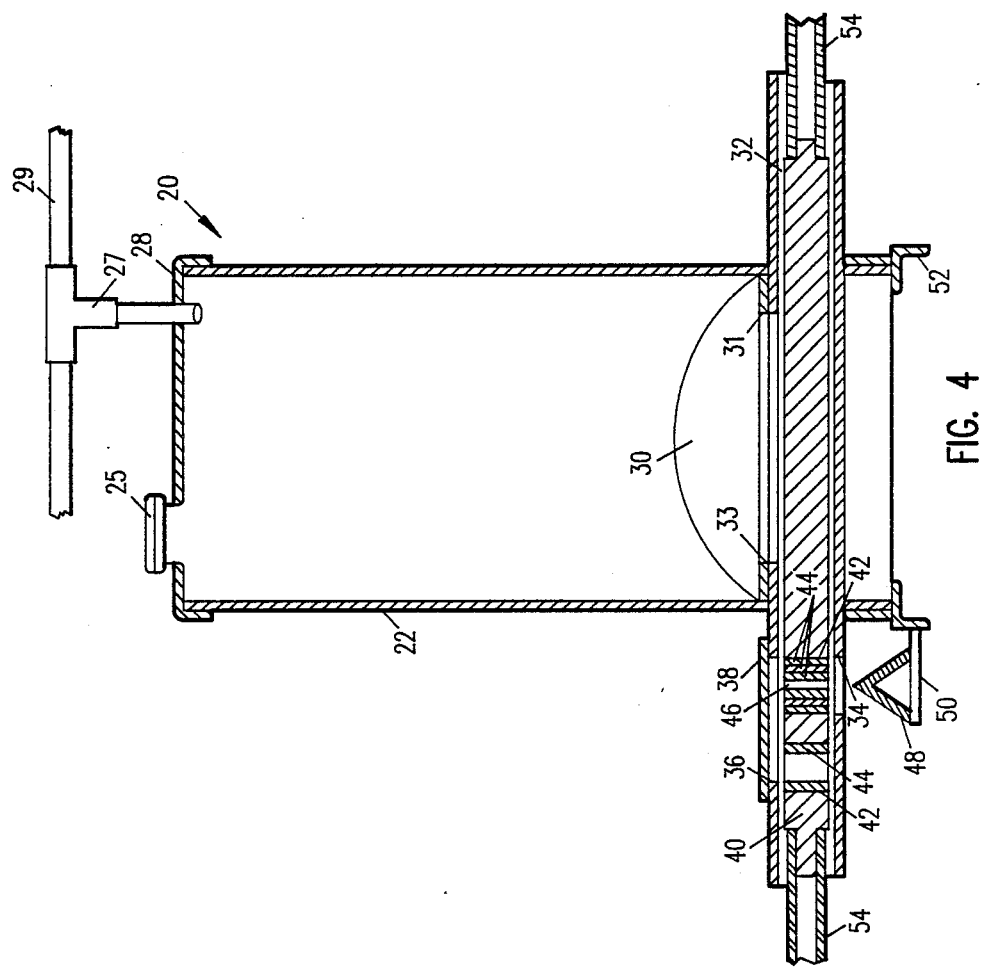
FIG. 4 is a vertical cross-sectional view of a hopper of one presently preferred embodiment of the present invention taken along lines 4—4 of FIG. 2.
Figure 3:
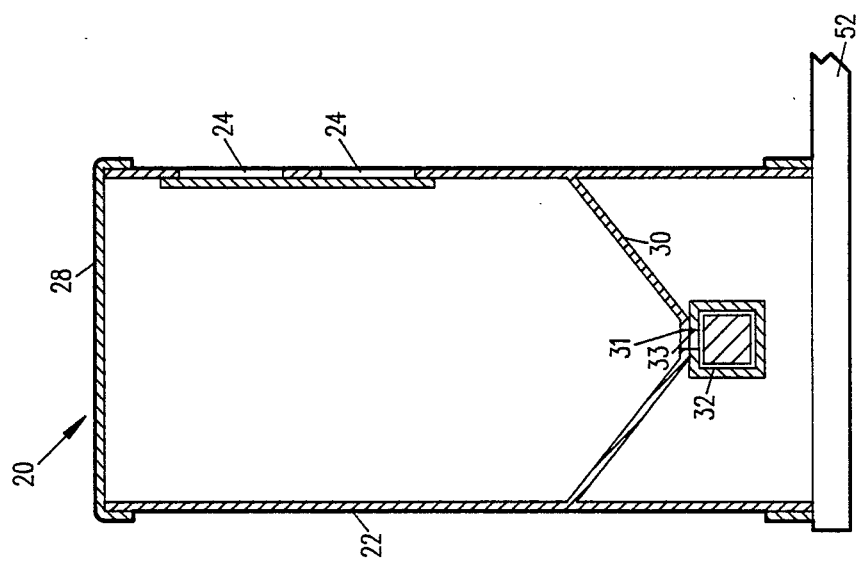
FIG. 3 is a vertical cross-sectional view of a hopper of one presently preferred embodiment of the present invention taken along lines 3—3 of FIG. 2.
Figure 6:
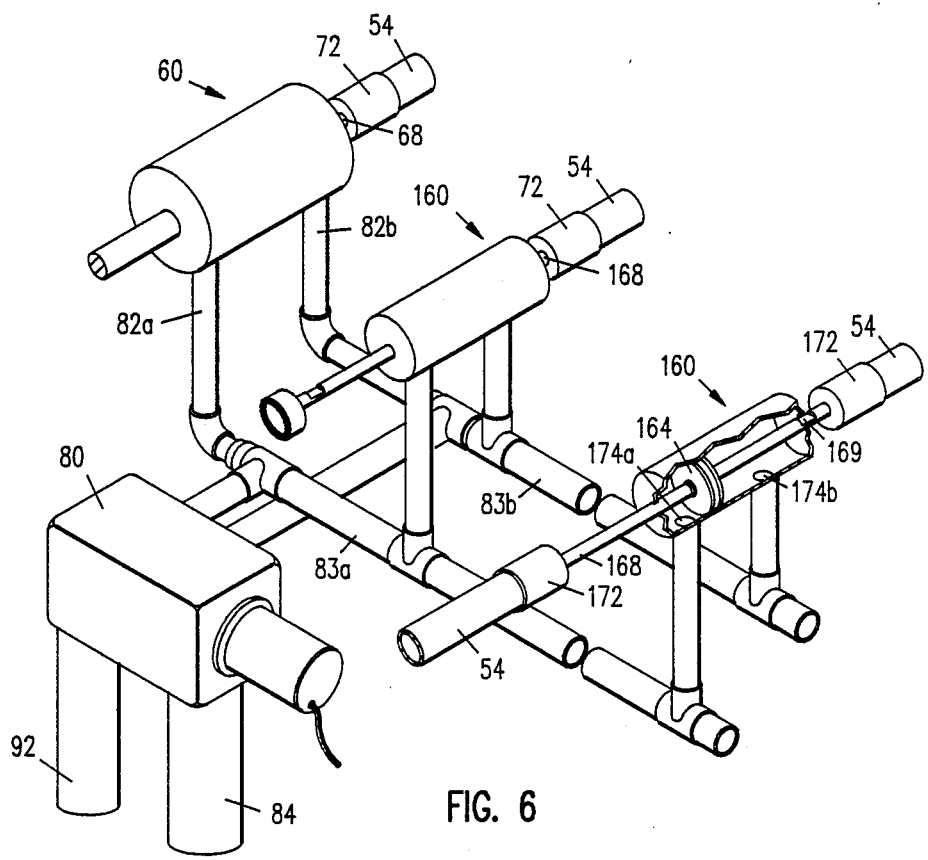
FIG. 6 is a perspective view illustrating the manner in which a single control mechanism can control the operation of a plurality of water-powered rams for articulating the slide members of one presently preferred embodiment of the animal feed dispenser system of the present invention.

The configuration of one presently preferred embodiment of hoppers 20 can be best understood with reference to FIGS. 2-4. Those skilled in the art will readily appreciate, however, that numerous different hopper configurations could be used in connection with the feed dispenser system of the present invention. For example, the feeding system can also be used to dispense feed to multiple individual small ponds with only one hopper provided per pond, or to dispense feed to multiple individual ponds each with any number of hoppers 20 mounted adjacent to and above individual ponds. The described configurations could be controlled using a single valve 80 and water-powered ram 60 (as shown in FIG. 6) to control the operation of all secondary rams 160, to be described hereinbelow.

Hoppers 20 may have any suitable shape and size and may be formed of a wide variety of materials. For example, as illustrated in FIGS. 2-4, hoppers 20 may be substantially cylindrical in shape and may be formed of a suitable plastic material, such as polyvinyl chloride ("PVC"). In such case, cylindrical wall 22 of hopper 20 may be formed of twelve-inch (30.48 cm) diameter of PVC pipe of some suitable length, such as, for example, 40 inches (101.60 cm).

The bottom 30 of hopper 20 can likewise be formed of a variety of materials. As with cylindrical wall 22, bottom 30 could be formed of PVC or some other suitable plastic material. Alternatively, bottom 30 can be formed of 20 gauge galvanized steel.

Bottom 30 of hopper 20 has an outlet 31 formed therein. Outlet 31 in bottom 30 may, of course, have a wide variety of shapes. However, as depicted in FIGS. 3 and 4, it is presently preferred that outlet 31 be formed as a substantially linear slot and that bottom 30 be inclined downwardly, as shown, so as to direct feed within hopper 20 through outlet 31.

Hopper 20 is also preferably provided with a lid 28. Lid 28 may be formed of PVC or any other suitable material. Hopper 20 may also advantageously be provided with one or more suitable windows 24 for observing the level of feed therein. Lid 28 may also have a six-inch diameter covered access port 25 with lid for inspection and manual filling when necessary.

Optionally, hopper 20 may be connected through a suitable orifice 27 in lid 28 to a conventional automatic feed conveyor system 29. In this way, hopper 20 can be automatically filled from an adjacent feed silo 23 using a suitable feed conveyor system (a two-inch diameter feed delivery system manufactured by INTRACO INC. under the name "Cable Vey" is a suitable feed conveyer system for this purpose).

As mentioned previously, a slide member 54 is associated with each battery 18 of hoppers 20 (as shown in FIG. 1). It will be readily appreciated that slide member 54 can have a wide variety of different shapes and configurations. For example, each battery 18 of hoppers 20 is shown herein as being a substantially linear array, and slide member 54 is thus illustrated herein as being a substantially linear, rigid member. A battery 18 of hoppers 20 may, however, have virtually any desired arrangement. Slide member 54 would then be appropriately configured so as to simultaneously engage each hopper 20 in the battery 18 and so as to be capable of being articulated by a single driving means.

Slide member 54 may also have any suitable cross-sectional configuration. For example, slide member 54 may have a substantially circular cross-section. Alternatively, slide member 54 may have a substantially square cross-section or may be formed from a combination of elements having cross-sections of different shapes.

In the preferred embodiment illustrated in the figures herein, the portion of slide member 54 which extends between adjacent hoppers 20 is substantially cylindrical. This cylindrical portion may be formed of any suitable material, such as, for example, two-inch (5.08 cm) diameter galvanized rigid conduit pipe.

At the same time, as shown best in FIGS. 3 and 4, those portions 40 of slide member 54 which engage hoppers 20 have a substantially square cross-section. Portions 40 of slide member 54 may likewise be formed from a wide variety of different materials. For example, square portion 40 may be formed of a suitable wood, such as fir, and may have cross-sectional dimensions of approximately 4 inches by 4 inches (10.16 cm × 10.16 cm).

Importantly, each portion 40 of slide member 54 which lies adjacent each hopper 20 has a substantially square cross-section. Accordingly, as shown in FIGS. 2-4, sleeve 32 likewise has a substantially square cross-section. Preferably, there is a fairly close tolerance between sleeve 32 and the portion 40 of slide member 54 which lies adjacent hopper 20. An acceptable tolerance may, for example, be approximately 0.0313 inch (0.79 mm).

It is important that the bores 42 through portion 40 of slide member 54 be able to communicate with the outlet 31 in the bottom 30 of hopper 20. Therefore, sleeve 32 is provided with an inlet 33 which substantially corresponds in size and shape to outlet 31 in bottom 30.

Sleeve 32 is also provided with an outlet 34 through which feed may drop from bores 42 into fish ponds 10 (as shown in FIGS. 1 and 2). Importantly, outlet 34 in sleeve 32 is not in alignment with any portion of inlet 33 in sleeve 32. Thus, sleeve 33 prevents feed from dropping out of bores 42 when bores 42 are in communication with outlet 31 in bottom 30 of hopper 20.

To facilitate the proper dispensing of feed, a cone member 48 may be provided directly beneath outlet 34 in sleeve 32. Feed which drops from bore 42 thus strikes cone member 48 and is dispersed or spread out somewhat so as to be more readily available to the fish in fish ponds 10. Cone member 48 may be retained beneath outlet 34 in sleeve 32 in any suitable manner, such as, for example, by being secured to a suitable mounting rod 50.

It will be appreciated that sleeve 32 may have any suitable length and may be formed from a wide variety of different materials. For example, sleeve 32 may be formed of PVC tube having an appropriate square cross-section and may be approximately 50 inches (1.27 m) long.

From the foregoing, it will be appreciated that when slide member 54 is positioned such that bores 42 communicate with outlet 31 in bottom 30 of hopper 20, feed in hopper 20 may pass through outlet 31 and fill bores 42. When a bore 42 is thereafter positioned above outlet 34 in sleeve 32, the feed within bore 42 may drop through outlet 34 and into fish ponds 10. Thus, with each articulation of slide member 54, a measured volume of feed is dispensed from hopper 20 into fish ponds 10.

Advantageously, means may be provided for adjusting the volume of bores 42 so as to accommodate differing amounts of feed. For example, bores 42 may be provided with one or more inserts 44 for reducing the effective volume of bores 42. A plug 46 may also be provided such that a bore 42 may be totally occluded.

Bores 42 may have any suitable size. In the system illustrated in FIG. 1, a total of four hoppers 20 are positioned above each fish pond 10. In such cases, two bores may be provided in the portion 40 of slide member 54 adjacent each hopper, and each bore may be approximately 2 ⅜ inches (6.03 cm) in diameter. A number of inserts 44 may then be provided, as needed, so as to reduce the effective diameter of each bore down to about ¾ of an inch (1.91 cm).

There is preferably a fairly close tolerance between bore 42, concentric inserts 44 and plug 46. A suitable tolerance may, for example, be approximately 0.016 inches (0.41 mm) with respect to height and approximately 0.006 inches (0.15 mm) with respect to diameter.

Concentric inserts 44 and plug 46 may be formed of a variety of materials. It is presently preferred that inserts 44 be formed of PVC pipe having appropriate inside and outside diameters. Plug 46 could also be formed of PVC. Alternatively, plug 46 may be formed of wood.

In order to facilitate the insertion and removal of inserts 44 and plug 46, sleeve 32 may be provided with an opening 36 which is covered by a lid 38. As illustrated in FIG. 2, bores 42 may then be positioned under opening 36, and lid 38 may be opened, thereby permitting the desired inserts 44 and/or plug 46 to be placed within bores 42.

Lid 38 covering opening 36 in sleeve 32 may be formed of any suitable material. For example, lid 38 may be formed of molded PVC and may be secured to sleeve 32 by means of a snap-on-off fit or by stainless steel hinges.

Significantly, when hoppers 20 and slides 54 are configured as described above, the feed dispenser system of the present invention is extremely versatile. By using four hoppers 20 per fish pond 10, as depicted in FIG. 1, the amount of feed dispensed into each fish pond 10 may be varied from between 20 to over 650 ponds per day in approximately three pound increments simply be using appropriate inserts 44 within bores 42 in slide member 54. Further adjustment is also possible by adjusting the speed at which slide member 54 is articulated. In some cases, extremely small quantities of feed may be needed, such as, for example, within hatch houses. In such cases, the small feed rates may be readily accommodated by making slide member 54 smaller or thinner. Then one ounce to one hundred pounds may be fed in less than one-pound increments.

Hoppers 20 may be secured above fish ponds 10 in any suitable manner. One convenient method of securement employs catwalks 14, as shown in FIGS. 1 and 2. Catwalks 14 are secured in a conventional manner to the walls 12 of fish ponds 10. Hoppers 20 are then secured to catwalks 14 by means of a suitable mounting bracket 52. Mounting brackets 52 and catwalks 14 may be formed of any suitable material, such as, for example, hot dipped galvanized steel.

A significant advantage of using a battery 18 of hoppers 20, as described above, is that the slide member 54 associated with each battery 18 may be articulated using a single driving means. Numerous different types of driving means for articulating slide member 54 are possible. For example, slide member 54 could be articulated using a suitable hydraulic oil ram, a pneumatic ram, an electric motor, and/or other known driving means, Advantageously, in order to maximize the number of hoppers 20 in a single battery 18, slide member 54 can be articulated with a centrally located double-acting ram 60, as illustrated in FIGS. 1 and 2. Such a ram can easily accommodate up to 50 hoppers in a single battery.

When using the feed dispenser system of the present invention for feeding fish, a supply of water is, of course, readily available. Thus, double-acting water powered rams can be conveniently used to articulate the slide member 54 of each battery 18 of hoppers 20.

One presently preferred embodiment of a water-powered ram 60 for articulating the slide member 54 of a battery 18 of hoppers 20 is illustrated in FIGS. 2 and 6. As shown, ram 60 may comprise a cylindrical housing 62 which may, for example, be formed of six-inch (15.24 cm) diameter PVC pipe.

The required length of cylindrical housing 62 will, of course, depend upon the configuration of hoppers 20 and slide member 54. Ram 60 must be able to articulate slide member 54 such that bores 42 through portion 40 of slide member 54 can be successively positioned so as to communicate first with outlet 31 in bottom 30 of hopper 20 and then with outlet 34 in sleeve 32 (as shown in FIG. 4). Using the illustrative dimensions described above for hopper 20, a suitable stroke length for ram 60 may be approximately 14 inches (35.56 cm).

End plates 66 are provided on each end of cylindrical housing 62 of ram 60. End plates 66 are secured to cylindrical housing 62 in a conventional manner so as to be capable of withstanding the internal pressure which develops during the operation of ram 60. End plates 66 may be formed of any suitable material, such as, for example, hot dipped galvanized steel.

Figure 5:
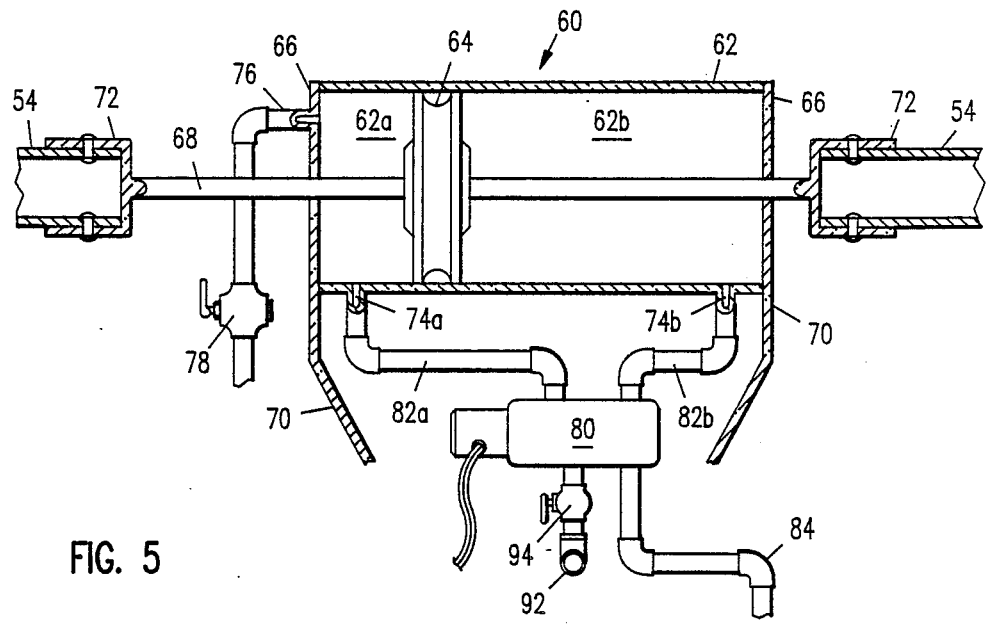
FIG. 5 is a vertical cross-sectional view of one presently preferred embodiment of the means for articulating the slide member associated with a battery of hoppers taken along lines 5—5 of FIG. 2.

A shaft 68 passes through both end plates 66 as depicted in FIG. 5. Shaft 68 may, for example, be formed of stainless steel, and a water-tight seal is provided between shaft 68 and end plates 66 by means which are well known in the art.

A piston 64 is provided on shaft 68 within housing 62. Piston 64 forms a water tight seal with housing 62 so as to divide housing 62 into separate compartments 62a and 62b. Piston 64 may be formed of any suitable material, such as, for example, polyurethane.

Shaft 68 of ram 60 is connected to slide member 54 in some appropriate fashion. For example, as illustrated in the figures herein, shaft 68 may be provided with a sleeve 72 at each end, and slide member 54 may be secured within sleeve 72 using a suitable adhesive or using another appropriate method of securement.

A suitable mounting bracket 70 is provided for securing ram 60 to the walls 12 of fish ponds 10. Mounting bracket 70 may, for example, be formed of hot dipped galvanized steel and may be formed as an integral part of end plates 66.

Ram 60 is connected to a source of water power through a valve 80. A large number of valves could be used to accomplish the functions required of valve 80 (one suitable valve for this purpose is a 4-way solenoid valve manufactured by ASCO as Model No. 83421Cl).

As shown best in FIG. 2, water may be supplied to valve 80 by means of a pump 90. Advantageously, when the feed dispensing system of the present invention is configured as described above, sufficient water power may be obtained for several batteries 18 of hoppers 20 using a two horse-power pump (one suitable pump for this purpose is currently manufactured by Cornell under Model No. 1W2-2). Water from pump 90 may be supplied via conduit 92 through a ball valve 94 to valve 80. Valve 80 is also connected via conduits 82 to inlets 74 of ram housing 62. Finally, valve 80 is connected to a waste line 84 through which water drains from ram 60 under the force of gravity.

From the foregoing, it will be appreciated that valve 80 may be actuated to a first position such that water from supply conduit 92 passes through valve 80, through conduit 82b and into chamber 62b of ram 60 through inlet 74b. The water pressure within ram 60 then moves piston 64 and shaft 68 to the position shown in FIG. 5.

Valve 80 may then be actuated to a second position such that water from supply conduit 92 passes through valve 80, conduit 82a and inlet 74a into compartment 62a of ram 60. Piston 64 is then forced to the right in FIG. 5, and water drains out of compartment 62b under the force of gravity through conduit 82b, valve 80 and waste line 84.

Shaft 68, and thus slide member 54, can be readily articulated back and forth by appropriately actuating valve 80 such that water is directed through valve 80 first to one compartment and then the other compartment of ram 60. Such actuation of valve 80 might, for example, be accomplished using some type of timer device. Alternatively, conventional limit switches (not shown) could be provided such that the water flow through valve 80 is changed each time piston 64 reaches an end of housing 62.

As mentioned previously, it may be desirable to vary the rate at which slide member 54 is being articulated by ram 60. The rate of articulation can, of course, be controlled by adjusting the pressure of water being supplied by pump 90 through supply conduit 92. Alternatively, if one desires to decrease the rate of articulation of ram 60, the rate of articulating can be decreased by partially closing ball valve 94 through which water is supplied to valve 80. Significantly, such a rate adjustment would not affect the rate of articulation of any other rams 60. In fact, by closing valve 94, one ram 60 may be totally stopped, while other rams 60 continue to operate.

Advantageously, the above-described ram 60 has relatively low power requirements. As a result, ram 60 may be efficiently used to dispense feed from a relatively large number of hoppers 20. In fact, even though rams 60 may not operate around the clock, pump 90 may be operated continuously without sacrificing significant cost efficiency, During the winter months, rams 60 may only be needed for approximately eight hours per day. In cold climates, however, it may be desirable to keep water circulating through rams 60 even when they are not operating so as to prevent the water from freezing. In such cases, ram 60 may be provided with an outlet 76 and a valve 78, as seen best in FIG. 5, to facilitate the continuous circulation of water.

When ram 60 is not in operation, valve 80 can be switched such that water runs continuously through valve 80 and conduit 82a into compartment 62a of ram 60. If valve 78 is open, the water in compartment 62a can then leave ram 60 through outlet 76. At the same time, water can be allowed to drain from compartment 62b through conduits 74b and 84. In this way, water can continuously circulate through ram 60 and thereby prevent water from freezing within ram 60.

It will be appreciated that a significant cost associated with rams 60 is the cost of valve 80 and the associated controls. This expense can be minimized, however, when using multiple batteries 18 of hoppers 20 by using a single valve 80 to control the operation of all batteries 18. One suitable valve arrangement which accomplishes this result is illustrated in FIG. 6.

As depicted in FIG. 6, a valve 80 is connected to a ram 60 through conduits 82, to a supply of water through conduit 92, and to a waste line through conduit 74 in the same manner as described previously in connection with FIG. 5. In addition, valve 80 is connected through conduits 83 to secondary rams 160, as shown.

It will thus be appreciated that as water is directed through valve 80 and conduit 82a into ram 60, water will also be directed through conduits 83a into rams 160. This water pressure will cause the shaft 68 of ram 60 and the shafts 168 of rams 160 to move in the same direction. Then, when shaft 68 of ram 60 is reversed, either as a result of a timer or appropriate limit switches, rams 160 will likewise operate in a reverse direction.

In order to ensure that secondary rams 160 make a full cycle, conduits 83 may be slightly larger than conduits 82 such that more water is being supplied to rams 160, thereby advancing rods 168 of rams 160 at a faster rate. Alternatively, the internal capacity of rams 160 may be somewhat smaller than ram 60 such that rams 160 require less water to complete a full cycle. Of course, rams 160 can both be smaller in capacity and be provided with larger supply conduits 83, as depicted in FIG. 6.

When secondary rams 160 are configured so as to operate at a somewhat faster rate than rams 60, it may be desirable to provide a pair of spaced apart holes 169, 170 drilled into shaft 168 of rams 160 adjacent sleeve 172 and connected internally by a hollow portion of shaft 168. The pair of holes 169, 170 are positioned so as to provide a release for excess water pressure build up at the end of each cycle. Hole 169 is appropriately chamfered to prevent scoring of the shaft 168 packing seals. Significantly, as shown in FIG. 6, holes 169, 170 do not allow water to pass out of rams 160 until piston 164 of ram 160 is at the end of a cycle.

From the above discussion, it will be appreciated that the present invention provides an automatic feed dispenser system which is both simple and inexpensive to manufacture and maintain. Significantly, feed can be simultaneously dispensed from multiple hoppers using a single drive mechanism. This provides significant advantages over prior art dispenser systems which require separate controls and driver mechanisms for each hopper.

The feed dispenser system of the present invention also minimizes the destruction of feed by the feed dispenser system. The slide member associated with the hoppers is typically articulated at a fairly slow rate of no more than fourteen inches is crushed or sheared by the dispenser system and which will not be consumed.

The present invention also provides an automatic feed dispenser system which can be readily adjusted to dispense a consistent amount of feed on a regular basis. It is believed that the present invention will dispense feed consistently within approximately 0.5 to 1 percent. This is a marked improvement over prior art feed dispenser systems.

The feed dispenser system of the present invention is also easily adjustable to dispense the feed at different rates. Even in adjacent fish ponds, the feed can be dispensed by the same feed dispenser system at significantly different rates, thereby accommodating widely different sizes and tonnage of fish. No known prior art feed dispenser system provides this advantage.

Further, the present invention is readily adapted to handle feed of all consistencies needed for raising fish. The feed dispenser system is also moisture resistant and has minimal electrical component parts. Thus, the feed dispenser system of the present invention is believed to be much more versatile, trouble-free and safe than the feed dispenser systems available in the prior art.

The invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

We claim:

1. An animal feed dispenser system, comprising:
    a battery of hoppers, each hopper having an outlet through which the animal feed can be dispensed;
    a slide member disposed adjacent the battery of hoppers so as to engage the outlets of all of the hoppers in the battery, the slide member having a plurality of bores therethrough;
    means associated with each hopper for preventing animal feed from dropping out of a bore through the slide member when said bore through the slide member is in communication with an outlet of a hopper;
    a plurality of inserts each having a different diameter, said plurality of inserts selectively receivable in the bore through the slide member for decreasing the effective volume of said bore; and
    means for articulating the slide member such that the outlet of each hopper in said battery is periodically in communication with one or more bore through the slide member.

2. An animal feed dispenser system as in claim 1 wherein said means for preventing animal feed from dropping out of a bore through the slide member comprises a tubular sleeve member which slidably receives a portion of the slide member.

3. An animal feed dispenser system as in claim 1 wherein said means for articulating the slide member comprises a double-acting ram connected to a central portion of the slide member.

4. An animal feed dispenser system as in claim 3 wherein said double-acting ram is coupled to a central portion of said slide member, an end portion of said slide member extending on each side of said double-acting ram, said double-acting ram positioned at a central point with respect to said battery of hoppers.

5. An animal feed dispenser system as in claim 1 further comprising:
   feed storage means for storing large amounts of feed positioned adjacent said battery of hoppers; and
   feed distribution means coupling said feed storage means to each hopper in said battery of hoppers for periodically filling of said hoppers.

6. An animal feed dispenser system as in claim 5 wherein said feed distribution means comprises an overhead automatically controlled feed conveyor system coupling said feed storage means to each of said hoppers in said battery of hoppers.

7. An animal feed dispenser system, comprising:
   at least two bateries of hoppers, each hopper having an outlet through which the animal feed can be dispensed;
   a slide member disposed adjacent each battery of hoppers so as to engage the outlets of all the hoppers in the battery, each slide having a plurality of bores therethrough;
   means associated with each hopper for preventing animal feed from dropping out of a bore through the adjacent slide member when said bore through said slide member is in communication with an outlet of said hopper;
   a double-acting ram coupled to a central portion of each slide member for articulating the slide member adjacent each battery of hoppers such that the outlet of each hopper in each battery is periodically in communication with one or more bores through the adjacent slide member, an end portion of each slide member extending on each side of said double-acting ram, said double-acting ram positioned at a central point with respect to each battery of hoppers; and
   said several double-acting rams being responsive to a single control mechanism.

8. An animal feed dispenser system as in claim 7 wherein said double acting ram comprises a water powered double-acting ram.

9. An animal feed dispenser system as in claim 8 further comprising pump means providing water under pressure to operate each of said water powered double-acting rams.

10. An animal feed dispenser system as in claim 9 further comprising control valve means controlling the distribution of said pressurized water.

11. An animal feed dispenser system as in claim 10 wherein said single control mechanism comprises single control valve means controls the distribution of pressurized water to a plurality of said water powered double-acting rams, each said double-acting ram including means for relieving the buildup of water pressure at the completion of each power stroke.

12. An animal feed dispenser system as in claim 7 further comprising:
   feed storage means for storing large amounts of feed positioned adjacent said bateries of hoppers; and
   feed distribution means coupling said feed storage means to each hopper in each of said batteries of hoppers for periodically filling of said hoppers.

13. An animal feed dispenser system as in claim 12 wherein said feed distribution means comprises an overhead automatically controlled feed conveyor system coupling said feed storage means to each of said hoppers in each of said batteries of hoppers.

14. A fish feed dispenser system comprising:
   at least one feed hopper holding a supply of fish feed, said feed hopper having an outlet through which fish feed can be dispensed;
   a slide member disposed adjacent said feed hopper so as to engage the outlet of said feed hopper, said slide member having at least one bore therethrough;
   a plurality of inserts each having a different diameter, said plurality of inserts selectively receivable in a bore through said slide member for decreasing the effective volume of said bore;
   tubular sleeve mans associated with said feed hopper for slidable receiving a portion of said slide member for reciprocal motion therein and for preventing fish feed from dropping out of said bore through said slide member when said bore through said slide member is in communication with an outlet of said feed hopper, said tubular sleeve means having an outlet through which fish feed contained in said bore drops when said bore is aligned therewith; and
   articulating means for articulating said slide member such that said outlet of said feed hopper is periodically in communication with one of more bores through said slide member.

15. A fish feed dispenser system as in claim 14 wherein said means for articulating said slide member comprises a double-acting ram coupled to said slide member.

16. A fish feed dispenser system as in claim 15 further comprising a plurality of said slide members, each of said slide members disposed adjacent and associated with one or more of said hoppers, one of said means for articulated said slide member associated with each of said plurality of slide members.

17. A fish feed dispenser system as in claim 16 wherein said means for articulating said slide member comprises a water powered double-acting ram coupled to each of said plurality of slide members.

18. A fish feed dispenser system as in claim 17 further comprising:
   pump means for providing pressurized water to said water powered double-acting rams;
   a distribution system for coupling said pump means to each of said water powered double-acting rams; and
   control valve means associated with each of said water powered double-acting rams controlling the distribution of pressurized water to each water powered double-acting ram.

19. A fish feed distribution system as in claim 18 wherein the several water powered double-acting rams are responsive to a single control mechanism.

* * * * *